B. H. CORNELIUS.
STREET CAR HEADLIGHT SHIFTER.
APPLICATION FILED SEPT. 8, 1914.
1,144,691.
Patented June 29, 1915.
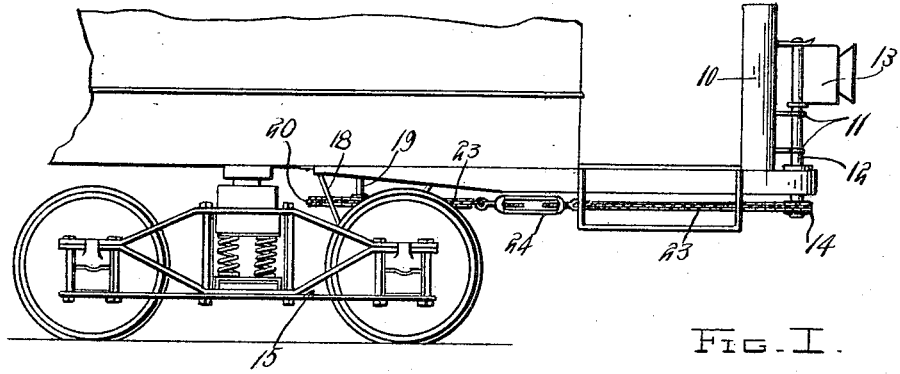
Fig. 1.
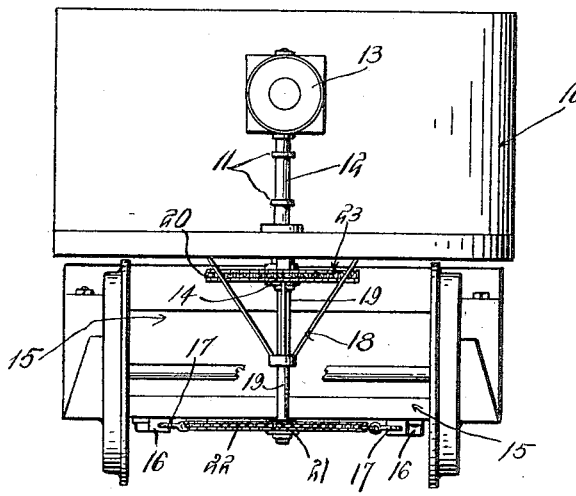
Fig. 2.
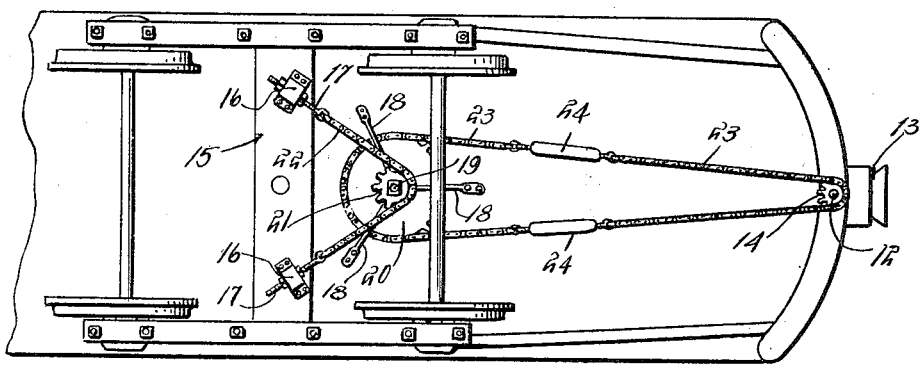
Fig. 3.
Witnesses
J. C. Simpson
Harry M. Test.
Inventor
B. H. Cornelius.
By 
Attorneys

UNITED STATES PATENT OFFICE.

BENJAMIN H. CORNELIUS, OF BAYARD, IOWA.

STREET-CAR-HEADLIGHT SHIFTER.

1,144,691. Specification of Letters Patent. Patented June 29, 1915.

Application filed September 8, 1914. Serial No. 860,722.

*To all whom it may concern:*

Be it known that I, BENJAMIN H. CORNELIUS, a citizen of the United States, residing at Bayard, in the county of Guthrie, State of Iowa, have invented certain new and useful Improvements in Street-Car-Headlight Shifters; and I do hereby declare the following to be a full, clear, and exact description of the invention, such as will enable others skilled in the art to which it appertains to make and use the same.

This invention relates to improvements in headlights, and particularly to dirigible headlights for street cars.

The principal object of the invention is to provide a simple and novel mechanism for moving the headlight so as to cause the rays of light therefrom to continuously shine on the track while the car is rounding a curve.

Another object is to provide a simple device of this character which can be readily applied to an ordinary street car without modifications to the car.

Other objects and advantages will be apparent from the following description when taken in connection with the accompanying drawings.

In the accompanying drawing: Figure 1 is a side elevation of portions of a street car showing my invention in elevation. Fig. 2 is a front elevation. Fig. 3 is a bottom plan view.

Referring particularly to the accompanying drawings, 10 represents the dash board of the car on the front of which is secured a pair of brackets 11. Journaled on these brackets is a vertical shaft 12, the upper end of which carries a headlight lamp 13, and the lower end a sprocket wheel 14.

Secured on each side of the front end of the truck 15 of the car is a block of insulation 16, each of which carries a bar 17 directed forwardly and inwardly.

Depending from the bottom of the car, slightly in advance of the truck, is a bracket 18 in which is journaled a vertical shaft 19, the upper end of which is provided with a large sprocket wheel 20, and the lower end with a smaller sprocket 21. Secured at its opposite ends to the forward ends of the bars 17 is a length of chain 22 which passes around the forward portion of the sprocket 21.

Trained around the sprockets 14 and 20 is a chain 23 in each lap of which is arranged a turn buckle adjusting device 24.

It will thus be seen that when the truck 15 takes a curve, the truck will swing causing the chain 22 to rotate the shaft 19 and communicate rotary motion to the shaft 12, the result being that the lamp 13 is turned so as to direct its rays of light onto the track at all times. As the truck again reaches a straight track it will swing back into normal position and through the means of the chains and sprockets will turn the lamp so as to direct its rays straight ahead.

By means of the turn buckles 24, any slack in the chain 23 can be readily taken up. The bars 17 are adjustably slidable through the blocks 16 so as to take up any slack in the chain 22.

What is claimed is:

The combination with the front truck and dash board of a car, of a headlight carrying shaft mounted on the dash board, a sprocket carried by the shaft, a depending shaft mounted in front of the truck, a larger sprocket wheel on the upper edge of the shaft, a smaller sprocket on the lower edge of the shaft, blocks of insulation secured to the underside of the truck, bars slidably adjustable in the blocks, a chain turned around the first named sprocket and said larger sprocket, adjusting means carried in the chain for taking up slack, and a chain connected at its end to the said adjustable bars and trained around the last named small sprocket.

In testimony whereof I affix my signature, in the presence of two witnesses.

BENJAMIN H. CORNELIUS.

Witnesses:
FRANK BRIDSON,
R. C. JENKS.

Copies of this patent may be obtained for five cents each, by addressing the "Commissioner of Patents, Washington, D. C."